United States Patent [19]

Beery et al.

[11] 4,229,086
[45] Oct. 21, 1980

[54] PHOTOSENSITIVE RECORDER PROVIDING LINGUISTIC CHARACTERS

[75] Inventors: Jack Beery, Fairport, N.Y.; Andrew S. Mihalik, Jr., Northville, Mich.

[73] Assignee: Burroughs Corporation, Detroit, Mich.

[21] Appl. No.: 63,465

[22] Filed: Aug. 3, 1979

Related U.S. Application Data

[63] Continuation of Ser. No. 836,599, Sep. 26, 1977, abandoned.

[51] Int. Cl.³ .................. G03B 41/00; B41B 13/00
[52] U.S. Cl. .............................. 354/5; 346/107 R
[58] Field of Search ......................... 355/39–43, 355/50, 51; 354/4–7, 12; 346/107 R, 108; 178/15, 30

[56] References Cited

U.S. PATENT DOCUMENTS

| | | | |
|---|---|---|---|
| 3,212,399 | 10/1965 | Walter | 354/24 |
| 3,354,342 | 11/1967 | Ohntrup et al. | 313/500 |
| 3,670,633 | 6/1972 | Mason et al. | 354/11 |
| 3,750,553 | 8/1973 | Pfeifer et al. | 354/105 |
| 3,827,070 | 7/1974 | Hoerenz et al. | 354/105 |
| 3,832,488 | 8/1974 | Fahey et al. | 354/7 |
| 3,843,956 | 10/1974 | Kauneckas | 354/108 |
| 3,877,799 | 4/1975 | O'Donnell | 352/92 |
| 3,952,311 | 4/1976 | Lapeyre | 346/107 R |
| 3,987,467 | 10/1976 | Cowles | 354/105 |
| 3,998,544 | 12/1976 | Pass et al. | 355/40 |
| 4,000,495 | 12/1976 | Pirtle | 346/107 R |
| 4,001,846 | 1/1977 | Kauneckas | 354/105 |
| 4,087,173 | 5/1978 | Beery | 354/24 |
| 4,090,206 | 5/1978 | Pfeifer et al. | 354/4 X |
| 4,096,486 | 6/1978 | Pfeifer et al. | 346/107 R |
| 4,107,687 | 8/1978 | Pfeifer et al. | 346/107 R |

*Primary Examiner*—Michael L. Gellner
*Assistant Examiner*—W. J. Brady
*Attorney, Agent, or Firm*—Charles P. Sammut; Delbert P. Warner; Charles E. Quarton

[57] ABSTRACT

A recorder for placing linguistic character information on photosensitive media. The recorder utilizes a small number of selectively energizable light sources, relative motion between the light from those sources and the photosensitive media, and electronics to box. A size reduction lens that is in motion for a period of time focuses light from the light sources upon various areas of the microfilm. An optical position detector provides a sequence of timing pulses that indicate the position of the lens as it moves. A storage register is provided for receiving the externally supplied character data. Circuitry is provided that is responsive to the character data and the timing pulses to selectively energize the seven light sources in an appropriate sequential manner during the motion of the lens to provide the image of the desired linguistic character or characters on the microfilm.

9 Claims, 8 Drawing Figures

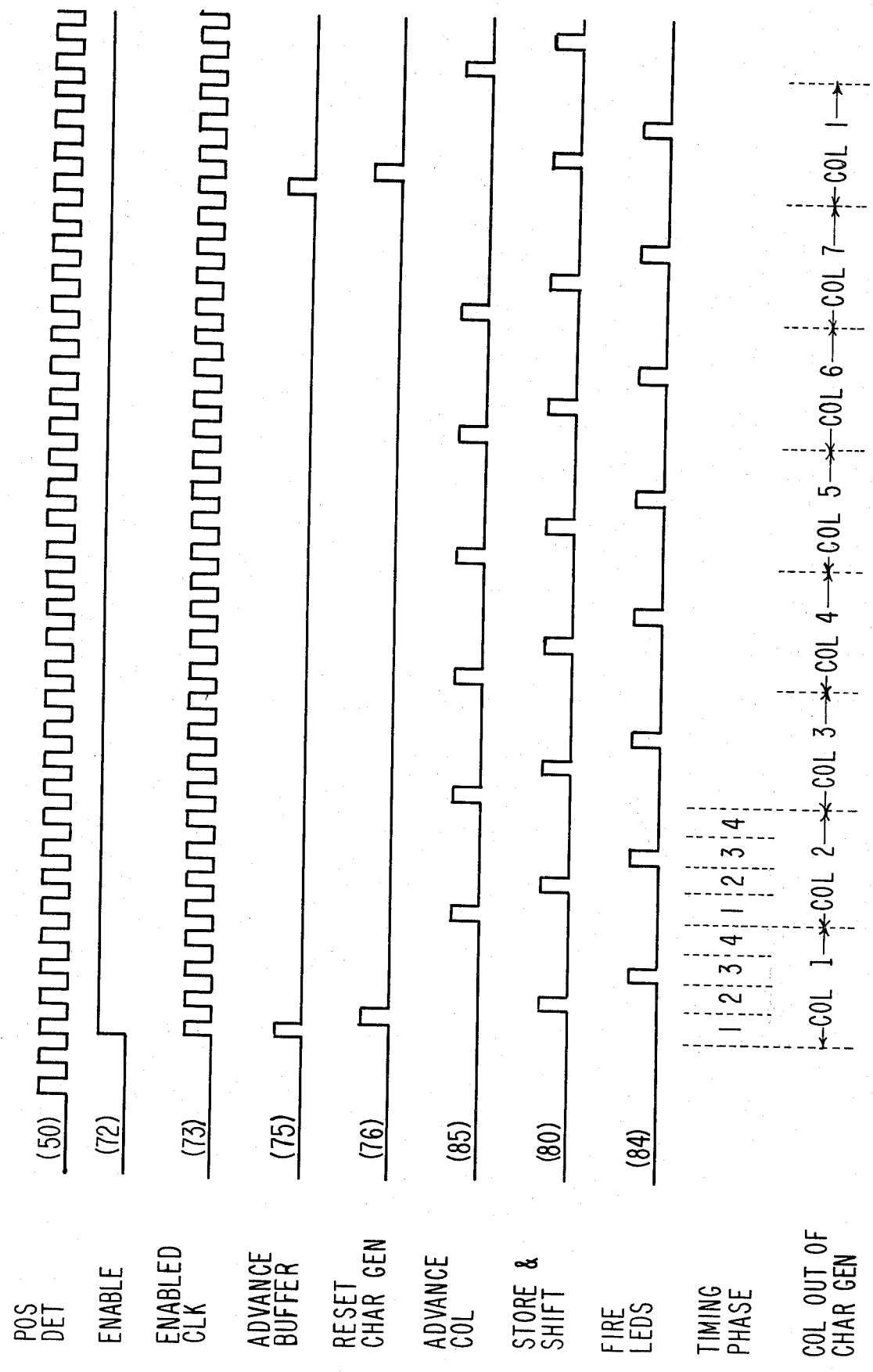

PHOTOSENSITIVE RECORDER PROVIDING LINGUISTIC CHARACTERS

CROSS REFERENCE TO RELATED APPLICATION

This is a continuation of application Ser. No. 836,599, filed 9/26/77, now abandoned.

Cross reference is made to U.S. patent application Ser. No. 723,361, now U.S. Pat. No. 4,087,173 entitled "Document Photography System" which is assigned to common assignee.

BACKGROUND OF THE INVENTION

1. Field of the Invention

This invention relates in general to photosensitive recorders; and more particularly to the recording of linguistic character images on photosensitive media in such recorders.

2. Description of the Prior Art

Recorders or cameras for recording images on photosensitive media are generally known. One such recorder, disclosed in U.S. patent application Ser. No. 723,361, now U.S. Pat. No. 4,087,173 utilizes a size reduction lens that tracks a moving document and places the document's front and rear images on microfilm.

It is often desirable to place linguistic character information on the photosensitive media of cameras together with other graphic images to identify such other images. Linguistic character information, such as alphanumeric information, is particularly advantageous when recording images on microfilm because vast amounts of images are recorded and identification of images is necessary for rapid recall. Furthermore, the placement of identifying information in linguistic format makes the identification information easily usable by people as well as machines. A simple, efficient, and reliable camera for recording linguistic character information on microfilm or other photosensitive media is thus highly desirable.

Various schemes exist for placing numerics and/or alphanumerics on photosensitive media such as described in U.S. Pat. No. 3,354,342 to Ohntrup et al, No. 3,670,633 to Mason et al, No. 3,827,070 to Hoerenz et al, No. 3,843,956 to Kauneckas, No. 3,877,799 to O'Donnell, No. 3,987,467 to Cowles, and No. 4,001,846 to Kauneckas.

Other schemes exist for placing numerics and/or alphanumerics on microfilm such as described in U.S. Pat. No. 3,212,399 to Walter, No. 3,750,553 to Pfeifer, and No. 3,998,544 to Pass et al.

However, none of the above patents provide a simple, efficient, cost-effective, and reliable apparatus for placing linguistic character information on microfilm or other photosensitive media according to the present invention.

SUMMARY OF THE INVENTION

The present invention utilizes a small number of selectively energizable light sources, relative motion between the light from those sources and the photosensitive media, and electronics to coordinate sequential flashing of those light sources to such motion to form individual or sequences of linguistic characters on the photosensitive media. Thus, the present invention can place a large amount of linguistic character information on the photosensitive media utilizing a minimum of light sources and light drivers to provide efficient, economical and reliable operation.

A recorder according to the present invention places on or more linguistic characters on photosensitive media; and includes a plurality of selectively energizable light sources that are arranged in a fixed predetermined relationship with respect to each other. The recorder also includes a portion of photosensitive media and means for focusing the light sources upon the photosensitive media. At least one of the light sources, focusing means and photosensitive media is in motion during the formation of the linguistic character(s) on the photosensitive media; and means provide a sequence of timing signals representative of such motion. Data representative of the linguistic character(s) to be placed on the film is provided; and a circuit means is responsive to the provided data and the sequence of timing signals to selectively energize at least one of the light sources in a sequential manner during the motion to provide the image of the desired linguistic character(s) on the photosensitive media.

The linguistic character images of the present invention can be those of any known language such as, for example, alphanumerics, Japanese, Chinese, Hebrew or Arabic to name a few.

In the preferred embodiment, the photosensitive recorder is a microfilm camera. The microfilm camera includes a camera box and seven discrete, selectively energizable LEDs that are fixedly mounted with respect to the camera box and arranged in two diagonals of four and three respectively. A portion of photosensitive microfilm is fixed at least temporarily with respect to the camera box. A size reduction lens that is in continuous scanning motion in one direction for at least a period of time focuses light from the LEDs upon various areas of the microfilm. An optical position detector provides a sequence of timing pulses that indicate the position of the lens as the lens moves. At least one storage register is provided for receiving alphanumeric character data in ASCII code. Circuitry is provided that is responsive to the ASCII character data and the optical position detector pulses to selectively energize the seven LEDs in an appropriate sequential manner during the continuous motion of the lens to provide the image of the desired character on the microfilm.

BRIEF DESCRIPTION OF THE DRAWINGS

FIG. 5 is an example timing diagram for the block diagram of FIG. 4.

DETAILED DESCRIPTION OF THE INVENTION

Figure 1:
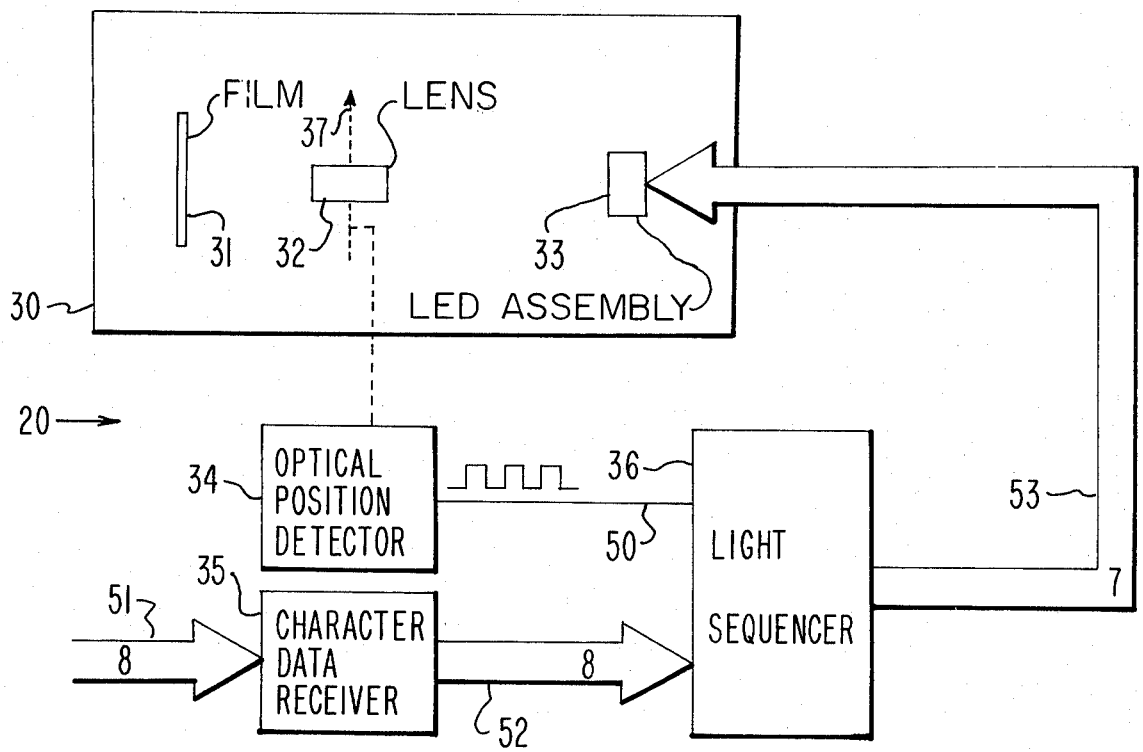
FIG. 1 is an overall block diagram representation of a microfilm camera for placing linguistic characters on microfilm according to the present invention.

FIG. 1 shows a block diagram of a microfilm camera 20 for placing linguistic characters, such as alphanumerics, on microfilm.

Figure 2:
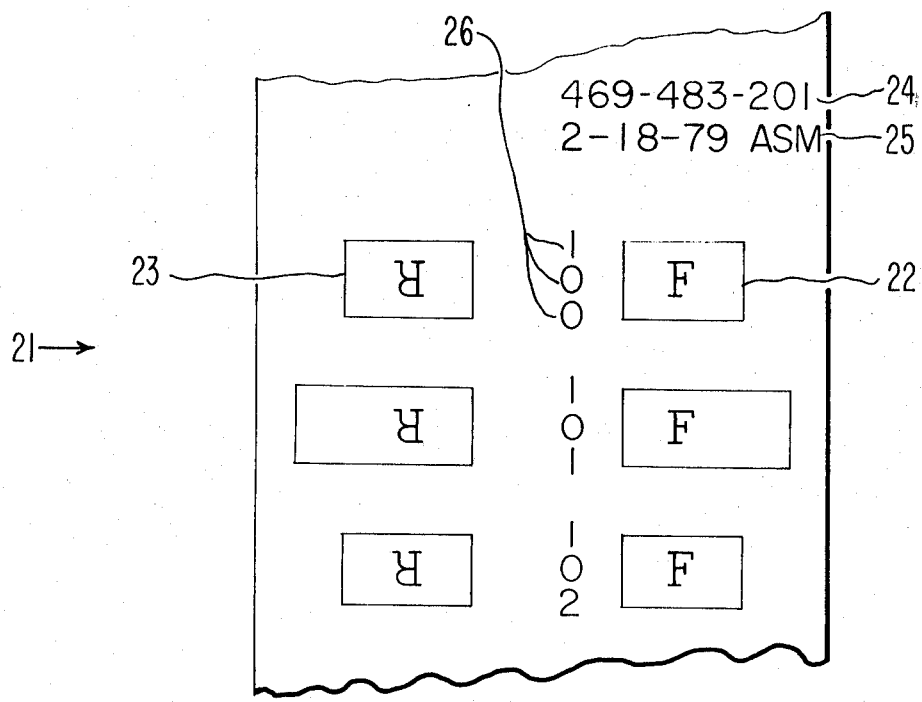
FIG. 2 is an illustrative view of a portion of a roll of microfilm showing alphanumeric character images placed thereon as well as images of the obverse and transverse sides of a bank check.

FIG. 2 shows a roll of microfilm 21 having linguistic character images thereon as well as the obverse and transverse (front and rear) images 22 and 23 of documents such as bank checks. The obverse and transverse images of documents can be placed on the microfilm in a manner disclosed in U.S. patent application Ser. No. 723,361, now Patent No. 4,087,173 which application is incorporated herein by reference. Briefly, such application discloses apparatus utilizing a moving size reduction lens that tracks a moving document and places its obverse and transverse images on microfilm. The present invention can provide horizontal rows of linguistic characters, such as shown in the header of film 21 at 24 or 25, or vertical rows of linguistic characters, such as shown at 26 between the obverse and transverse images of the checks. The film header 24 and 25 can be used to uniquely identify the microfilm roll 21 such as by roll number, date and machine operator's initials. The linguistic characters between the obverse and transverse image of each document can be used to uniquely identify each document image on the roll of microfilm.

Referring back to FIG. 1, the microfilm camera 20 can be used to place one or more linguistic characters on microfilm such as shown at 24. The camera 20 includes a camera box 30 containing a portion of microfilm 31, a lens 32 and a Light Emitting Diode (LED) assembly 33, all shown in top view. The camera 20 also includes an optical position detector 34, a character data receiver 35 and a light sequencer 36.

The film portions 31 within the camera 20 is fixed with respect to the camera box 30 while the linguistic characters are being exposed thereon. A different portion of film 31 may be moved into the exposure area to make additional exposures as desired.

The LED assembly 33 is fixed with respect to the camera box 30. The LED assembly 33 preferably has the diagonal type pattern of selectively energizable light sources shown in front view in FIG. 3A, but could have other patterns such as, for example, the columns or rows shown in front view in FIGS. 3B and 3C. The diagonal arrangement of LED assembly 33 is preferred because the individual LEDs 41 through 47 can be physically arranged such that their light will provide overlapping exposure on the film, as will become apparent later when the operation of the camera 20 to provide linguistic characters is explained. As shown in side view in FIG. 3D, each LED may be covered with a diffuser 48 to provide uniform light intensity and a mask 49 to provide a particular pattern of such uniform light intensity from the LED. While Light Emitting Diodes have been used in the preferred embodiment, other types of selectively energizable light sources could be used. Such light sources could provide visible light, ultraviolet light or any other frequency of electromagnetic radiation that the photosensitive film portion 31 is sensitive to for exposure purposes.

The lens 32 is a size reduction lens that reduces the light images from the LEDs by a ratio of approximately 50:1. The lens moves transversely between the LED assembly 33 and the film portion 31 in a straight line such as shown by the dotted arrow 37. The lens is mounted in a shuttle for motion in only the desired linear direction and is driven back and forth by an electric motor. As the lens moves transversely between the LED assembly 33 and the film portion 31, such as shown by the dotted arrow 37, light from the LEDs, that are energized, exposes various areas of the film. The lens and its motion are described in more detail in U.S. patent application Ser. No. 723,361, now Pat. No. 4,087,173. As the lens moves, the LEDs 41 through 47 are sequentially energized in a manner that creates the desired linguistic character or characters on the film. By sequentially energized, it is meant that a particular light source is turned on, turned off, and again turned on in forming the desired linguistic character.

The optical position detector 34 can be attached to the shaft that drives the lens 32 to detect the position of the lens as the lens moves. The detector 34 can be provided by a light source-photodetector pair separated by a moving slotted disc. The optical position detector supplies, on conductor 50, a sequence of timing signals representative of the position of the lens.

The character data receiver 35 receives 8 bit ASCII character data information (7 bits of ASCII data and 1 bit spare) on path 51. The data receiver includes at least one register for storing the data. Character data receiver 35 supplies 8 bit character data to light sequencer 36 via path 52.

The light sequencer 36 is responsive to the character data on path 52 and the timing signals or conductor 50 and provides on path 53 signals that selectively energize the LEDs of assembly 33. Thus, the LEDs are selectively energized as the lens moves to provide the image of the desired linguistic character or characters on the film portion.

Briefly, the portion of microfilm 31 of the preferred embodiment provides a portion of photosensitive media. The LEDs of assembly 33 of the preferred embodiment provides a plurality of selectively energizable light sources that are arranged in a fixed predetermined relationship with respect to each other. The lens 32 of the preferred embodiment provides a means for focusing the light source upon the microfilm or other photosensitive media. While the lens 32 of the preferred embodiment is in motion while forming the linguistic characters, alternatively, the photosensitive media or the plurality of light sources could be in motion during the sequential energization of the light sources to provide the image of the linguistic character on the photosensitive media.

The optical position detector 34 provides a means for providing an indication of the position of the lens during the motion. Alternatively, the position detector 34 could be replaced by a tachometer or a free running oscillator whose frequency is representative of the lens position or velocity. The position detector, the tachometer or the oscillator could each provide an indicating means for providing a sequence of timing signals representative of the motion. Such motion could of course be that of the lens, the film or the light sources.

The character data receiver 35 provides a means for receiving the linguistic character data to be placed on the photosensitive media. Such receiving means in a more general sense provides a means for providing linguistic character data to be placed on the photosensitive media.

The light sequencer 36 provides a circuit means responsive to the data providing means and the timing signal means for selectively energizing at least one of the light sources in a sequential manner during the motion to provide the image of the desired linguistic character on the photosensitive media.

Figure 3A:
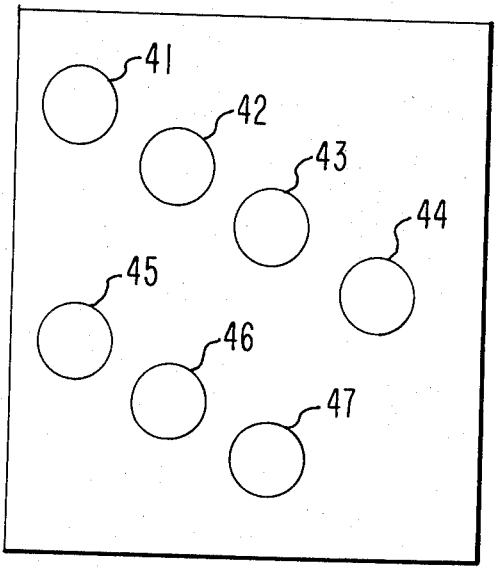
FIG. 3A is an illustrative front view of the LED assembly of FIG. 1.
Figure 4:
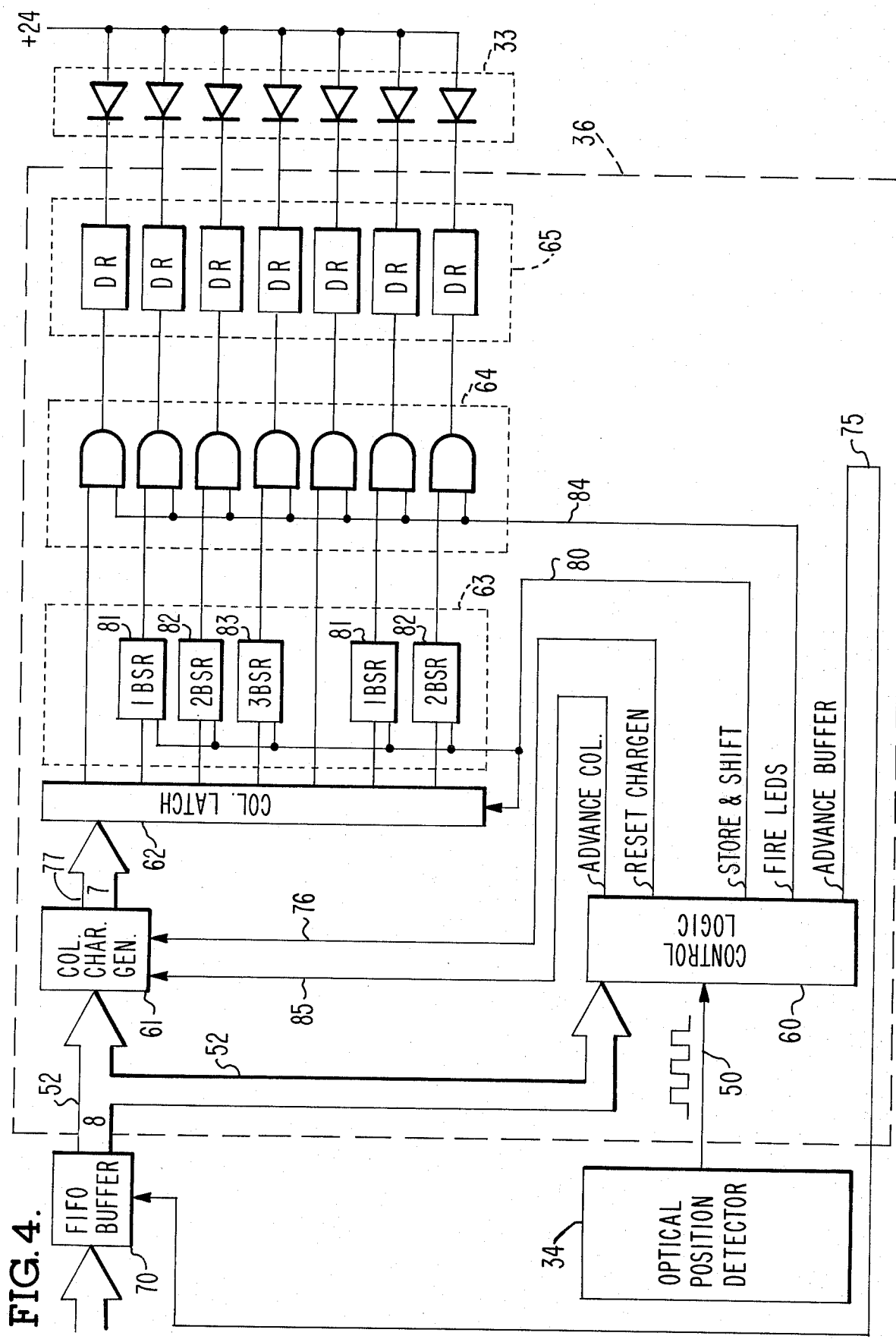
FIG. 4 is a more detailed block diagram of the optical position detector block, character data receiving block, light sequencer block and LED block of FIG. 1.

FIG. 4 shows a detailed electrical block diagram for the light sequencer block 36 together with its interface with the optical position detector block 34, character data receiver block 35 and LED assembly 33. Such light sequencer block may be used with the LED assembly of FIG. 3A. The light sequencer block 36 may be formed by a control logic 60, a column character generator 61, a column latch 62, shift register circuitry 63, AND gates 64, and driver circuitry 65. FIG. 5 shows a timing diagram for the circuitry of FIG. 4.

A FIFO (first in, first out) buffer 70 forms the character data receiver 35. The FIFO buffer may receive and store a sequence of 8 bit words, with the first word being a format word for control logic 60, the next succeeding words being character data words in ASCII code, and the last word being an end of message word.

Referring to FIG. 4 and FIG. 5 together, when control logic 60 detects a format word on path 52, it may start the microfilm camera lens in motion such that the optical position detector provides a sequence of timing pulses on conductor 50 as shown on the timing diagram. The control logic 60 counts timing pulses and provides an enable signal, shown at 72, such that the first linguistic character is properly positioned. The enable signal 72 is ANDed with the timing signal 50 to provide the enabled clock signal which is shown at 73. Such enabled clock signal provides four phases per column; and a character may be formed by seven columns. Five columns form the character, together with two column spaces between characters, such that the seven element LED assembly together with the motion provides 5×7 matrix characters on the microfilm.

During the first half of the first phase of column 1, an advance buffer signal on conductor 75 feeds back and advances the FIFO buffer 70 by one 8 bit word. Thus, the first ASCII character is input to column character generator 61 via path 52. During the second half of the first phase of column 1, a reset character generator signal on conductor 76 resets the character generator 61 to column 1 such that it provides 7 bits of column 1 data on path 77. The column character generator may, for example, be a Fairchild No. 3257 TTL type character generator.

Figure 3B:
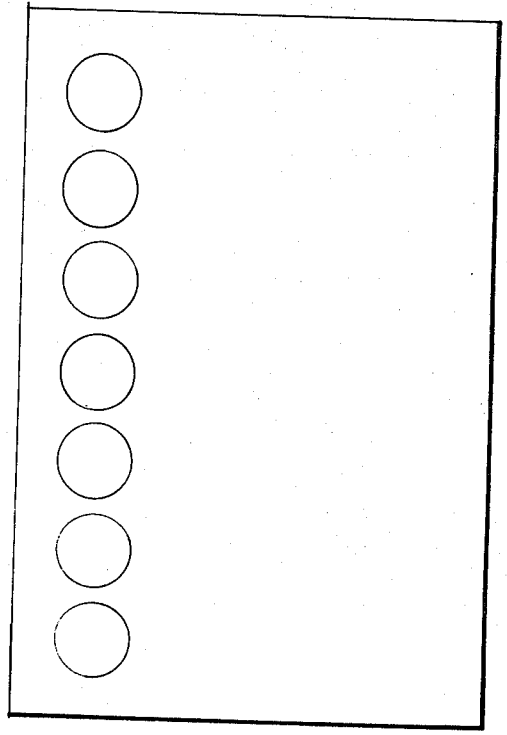
FIGS. 3B and 3C are illustrative front views of alternative LED assemblies.
Figure 3C:
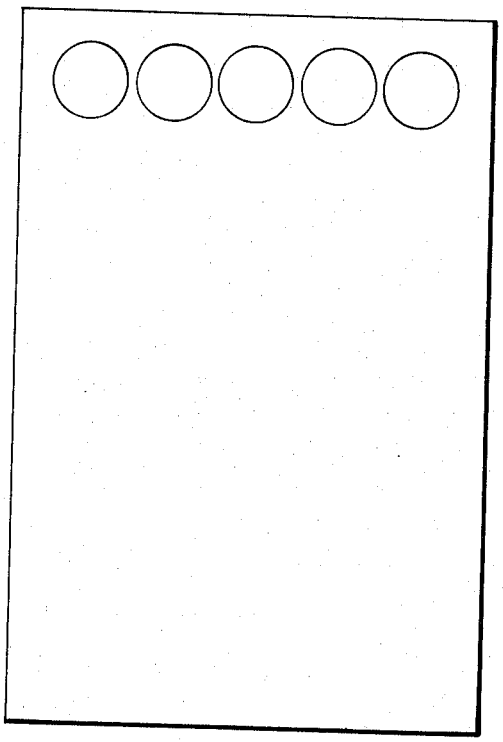
Figure 3D:
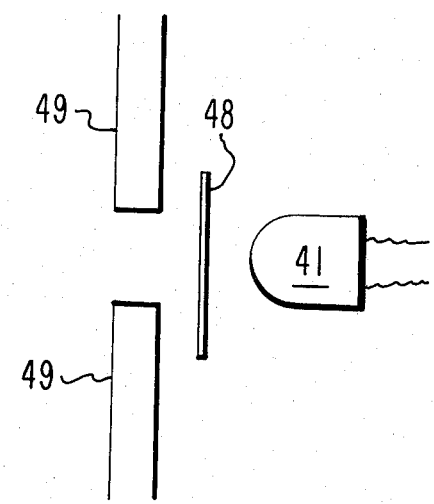
FIG. 3D is a side view of an individual LED.

During the second phase of column 1, control circuit 60 provides a store and shift signal on conductor 80. This store and shift signal loads the data on path 77 into column latch 62 and shifts data in column latch 62 into the shift register circuitry 63. The column latch 62 may be formed by a 7 bit type D flip flop register. The shift register circuitry 63 may be formed by one bit shift registers (1BSR) 81, two bit shift registers (2BSR) 82, and a three bit shift register (3BSR) 83. Such shift registers may be provided by an appropriate number of type D flip flops cascaded. The shift register circuitry delays the firing of LEDs to appropriately compensate for the fact that the LEDs are horizontally offset from a straight vertical column as shown in FIG. 3A. The shift register circuitry is appropriately cleared (reset) at the beginning of each new message.

During the third phase of column 1, control circuitry 60 provides a fire LED signal on conductor 84. The fire LED signal is ANDed with each of the 7 signals from shift register circuitry 63 by AND circuitry 64 such that a positive going pulse appears at the output of the AND circuitry for each LED to be energized, and a logical 0 appears at the output of the AND circuitry for each LED not to be energized. The driver circuitry 65 provides a separate inverting solid state driver circuit for each LED. Each driver circuit, when energized pulls approximately 200 milliamps through its LED to illuminate it. During the fourth phase of column 1, nothing occurs.

Thereafter, during the first phase of column 2, control circuitry 60 provides an advance column signal on conductor 85, which signal advances a cyclic counter within column character generator 61 to provide 7 bits of column 2 data on path 77. Thereafter; during phase two, this data is stored and shifted; and during phase three, the LEDs are energized.

The above described procedure for column 2 is repeated for columns 3 through 7, and then the control circuitry again advances the buffer via conductor 75 and resets the character generator via conductor 76 to start the next character. In this manner, a sequence of four or more linguistic characters can be placed in a single row such as shown at 24 in FIG. 2.

If more than one row of characters is desired, the above described procedure could be repeated for each row using a separate sweep of the lens and the same electronics. Alternatively, if more than one row of characters is desired, the electronics (33, 35 and 36) could be duplicated to provide multiple rows of characters with one sweep of the lens. As another alternative, if more than one row of characters is desired, a common column character generator 61 could be used together with a recirculating FIFO buffer (which buffer would be located between the buffer 70 and the character generator 61) to provide high speed data for each row such that only the column latch 62, shift register circuitry 63, AND gates 64, driver 65 and LED assembly 33 need be duplicated for each row. As another alternative, if one or more rows of characters are desired using a single sweep of the lens, microprocessor circuitry could be used to provide the function of one or more light sequencers 36.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. Apparatus for converting electrical signals representing visual information into a form which may be made visible in a photosensitive media, the electrical signals being used to operate selected light sources from among an array of light sources to produce light patterns for projection by movable projection means onto the photosensitive media, comprising:
   means for receiving and storing electrical signals representing visual information;
   position detecting means responsive to motion of said movable projection means to provide timing signals representative of said motion;
   sequencer means responsive to the electrical signals and the timing signals for selectively energizing the light sources to provide images through the projection means onto the photosensitive media;
   said sequencer means comprising a plurality of interconnected elements including control logic means, column character generator means, column latch means, shift register means, gating means and driver means;

said control logic means responding to the data signals and the timing signals to provide a plurality of control signals;

the column character generator responding to selected control signals and selected data signals to provide column data signals;

the column latch means and shift register means responding to column data signals from the character generator and store-and-shift signals from the control logic to shift data through the column latch and into the shift register;

the gating means responding to the presence of column data in the shift register and fire control signals from the control logic to energize the driver means and the related light sources.

2. Apparatus for converting electrical signals representing alphanumeric characters into alphanumeric characters on photosensitive media by employing the electrical signals in the control of a plurality of light sources, comprising:

a plurality of light sources arrayed in a selected pattern;

a strip of photosensitive media positioned to receive energy from said light sources;

movable focusing means positioned between the light sources and the photosensitive media for projecting energy from said light sources onto the photosensitive media;

means for receiving and storing electrical data signals representing characters to be reproduced on the photosensitive media;

position detecting means responsive to motion of said movable focusing means to provide a sequence of timing signals representative of said motion;

sequencer means responsive to the data signals and the timing signals for selectively energizing at least one of said light sources to provide an image through the movable focusing means onto the photosensitive media;

said sequencer means comprising a plurality of interconnected elements including control logic means, column character generator means, column latch means, shift register means, gating means and driver means;

said control logic means responding to the data signals and the timing signals to provide a plurality of control signals;

the column character generator responding to selected control signals and selected data signals to provide column data signals;

the column latch means and shift register means responding to column data signals;

the column latch means and shift register means responding to column data signals from the character generator and store-and-shift signals from the control logic to shift data through the column latch into the shift register;

the gating means responding to the presence of column data in the shift register and fire control signals from the control logic to energize the driver means and the related light sources.

3. The invention according to claim 1 or 2, in which:
the light sources for forming patterns include between five and ten sources;
said predetermined pattern of said light sources is at least one of a row, a column and a diagonal; and
at least two of said light sources are sequentially energized at spaced positions of said motion to provide said one linguistic character on said photosensitive media.

4. The invention as claimed in claim 2, in which said light sources are sequentially energized to provide a plurality of at least four characters in one row on said photosensitive media.

5. The invention as claimed in claim 1 or 2, wherein said light sources and said photosensitive media are fixed with respect to each other and said focusing means is moved in scanning motion with respect to said light source and said media for said period of time such that light from said light sources is focused upon various areas of said media.

6. The invention as claimed in claim 1 or 2, wherein said movable focusing means comprises a size reduction lens having a reduction ratio greater than 20:1.

7. The invention as claimed in claim 1 or 2, wherein said light sources further include diffusers and masks.

8. The invention as claimed in claim 7, wherein the predetermined relationship of the light source is at least one diagonal arrangement.

9. The invention as claimed in claim 7, in which the predetermined relationship of the light sources is a column.

* * * * *

UNITED STATES PATENT OFFICE
CERTIFICATE OF CORRECTION

PATENT NO. : 4,229,086

DATED : October 21, 1980

INVENTOR(S) : Jack Beery and Andrew Mihalik, Jr.

It is certified that error appears in the above-identified patent and that said Letters Patent are hereby corrected as shown below:

In the Abstract at line 5 after "to" and before "box" add the following: "coordinate sequential flashing of those light sources to such motion to form individual or sequences of linguistic characters on the photosensitive media. The disclosed embodiment is a microfilm camera that places linguistic characters on microfilm in response to externally supplied character data. The microfilm camera includes a camera box and seven discrete, selectively energizable light sources that are fixedly mounted with respect to the camera box. A portion of photosensitive microfilm is fixed at least temporarily with respect to the camera".

Col. 2 Line 4 Patent reads "places on or more"

should be "places one or more".

Signed and Sealed this

Thirteenth Day of January 1981

[SEAL]

Attest:

SIDNEY A. DIAMOND

Attesting Officer

Commissioner of Patents and Trademark